(12) United States Patent
Swartz

(10) Patent No.: US 6,872,350 B2
(45) Date of Patent: Mar. 29, 2005

(54) RACK AND PINION EJECTOR GUIDING SYSTEM FOR A MOLDING MACHINE

(76) Inventor: Donald L. Swartz, 10520 W. State Rd. 32, Yorktown, IN (US) 47396

(*) Notice: Subject to any disclaimer, the term of this patent is extended or adjusted under 35 U.S.C. 154(b) by 97 days.

(21) Appl. No.: 10/414,737

(22) Filed: Apr. 16, 2003

(65) Prior Publication Data
US 2004/0207119 A1 Oct. 21, 2004

(51) Int. Cl.[7] ............... B29C 33/44; B29C 45/40
(52) U.S. Cl. ............... 264/334; 425/556; 425/444
(58) Field of Search ............... 264/334; 425/556, 425/438, 441, 444; 249/66.1, 67, 68, 74

(56) References Cited

U.S. PATENT DOCUMENTS

| | | |
|---|---|---|
| 3,770,098 A | 11/1973 | Baugnies et al. |
| 3,807,920 A | 4/1974 | Aoki |
| 3,893,644 A | 7/1975 | Drazick |
| 4,050,666 A | 9/1977 | Van Tichelt |
| 4,207,051 A | 6/1980 | Wright et al. |
| 4,449,914 A | 5/1984 | Schmidts et al. |
| 4,514,166 A | 4/1985 | Ichizawa et al. |
| 5,439,368 A | 8/1995 | Martin |
| 5,744,082 A | 4/1998 | Bak |
| 5,882,553 A | 3/1999 | Prophet et al. |
| 5,906,841 A | 5/1999 | Bak |
| 5,908,597 A | 6/1999 | Boudreau et al. |
| 6,036,472 A | 3/2000 | Boudreau et al. |
| 6,187,247 B1 * | 2/2001 | Buzzell et al. ............... 264/334 |
| 6,190,585 B1 | 2/2001 | Brown et al. |
| 6,206,682 B1 | 3/2001 | Vovan |
| 6,207,087 B1 | 3/2001 | Brown et al. |
| 6,315,544 B1 * | 11/2001 | Burger et al. ............... 425/151 |
| 6,328,552 B1 | 12/2001 | Hendrickson et al. |
| 6,402,504 B1 | 6/2002 | Hahn et al. |
| 6,435,855 B1 * | 8/2002 | Sakurai ............... 425/139 |
| 2001/0040314 A1 | 11/2001 | Ondrejka |

FOREIGN PATENT DOCUMENTS

JP 363059521 A 3/1988

* cited by examiner

Primary Examiner—Jill L. Heitbrink
(74) Attorney, Agent, or Firm—Ice Miller

(57) ABSTRACT

An ejector system for use in an injection molding machine comprises a plurality of rack gears and pinions gears that provide active alignment of plates within the ejector system. As unequal force is experienced in ejecting a molded item, the rack and pinion gears distribute the force to other areas of the ejector system plate, maintaining proper alignment of the plates within the ejector system.

13 Claims, 5 Drawing Sheets

RACK AND PINION EJECTOR GUIDING SYSTEM FOR A MOLDING MACHINE

BACKGROUND OF THE INVENTION

Injection molding machines are used to produce plastic articles for use in a variety of applications. In general, plastic in liquid form is injected into a cavity which is formed by two mold assemblies. Once the plastic has cooled, the two mold assemblies are separated so as to remove the formed article. Upon separation, the molded article remains in one of the mold assemblies. In order to effect the removal of the formed article from the mold plate, some means of ejecting the article is typically required. A variety of approaches exist for effecting ejection, including the use of ejector or stripper plates, stripping pins and pressurized air.

Ejector plates are typically associated with one of the mold assemblies and act against the formed article, to force the article from the mold plate. Normally, force is applied to the ejector plate at a single location, which may be located at or near the center of the ejector plate. The ejector plate acts upon ejector pins which in turn force the molded article out of the mold assembly. These systems are called single knockout ejector systems. In certain applications, single knockout ejector systems are very effective. However, in other instances, the plastic article can be of a very complicated design. For example, an article may include deep part walls, deep part ribs, cored holes, and other non-uniform attributes. For these more complicated designs, single knockout ejector systems are less effective. The non-uniform attributes result in unequal forces being generated as the formed article is being ejected from the mold plate. Accordingly, misalignment of the ejector plate within the mold assembly may occur, resulting in cock of the ejector plate. If this situation is not corrected, the ejector plate will eventually bind, forcing the injection molding machine to be shut down and serviced, as well as causing damage to the mold assembly which must be repaired or replaced.

One approach to solving this problem, has been to incorporate rack and pinion gears into mold assemblies for articles which have non-uniform attributes. While this approach is effective, it is also very expensive. For example, the mold assemblies are constructed uniquely for a given article to be molded. In order to allow for manufacture of replacement parts, the mold assemblies are stored when not in use. Thus, re-use of parts within the mold assemblies for other mold assemblies is not a normal practice. Accordingly, each such mold assembly must incorporate a dedicated set of rack or pinion gears.

Therefore, it is desirable to provide an ejection mechanism that compensates for the effects of unequal forces as an article is being ejected. It is also desirable that the ejection mechanism be easily adapted for use with a variety of article shapes without the need to add manufacturing steps to the manufacture of mold assemblies. It is further desirable that the ejection mechanism be more cost effective than prior art approaches which use dedicated rack and pinion gears for each mold assembly. Moreover, it is desired that the ejection mechanism use common and relatively inexpensive components.

BRIEF SUMMARY OF THE INVENTION

In accordance with the present invention, a plurality of rack and pinion gears are used within an ejector plate guiding system. According to one embodiment, a system of pinion shafts are mounted to the guiding rails of the ejector plate, each pinion shaft having pinion gears located at each of the pinion shaft ends. The pinion gears are operably engaged with rack gears mounted on the ejector plate. Accordingly, as uneven pressure is applied to any area of the ejector plate, resulting in a change in motion, the change in motion is translated to the rack gears located nearest the location of uneven pressure. The rack gears operate with the pinion gears to translate this motion into the associated pinion shaft, and the motion is thus translated through the pinion shaft to the pinion gears at the opposite end of the shaft and then to the associated rack gears. This translation continues around ejector plate, such that all corners of the ejector plate travel at the same speed.

DETAILED DESCRIPTION OF THE INVENTION

Figure 1:
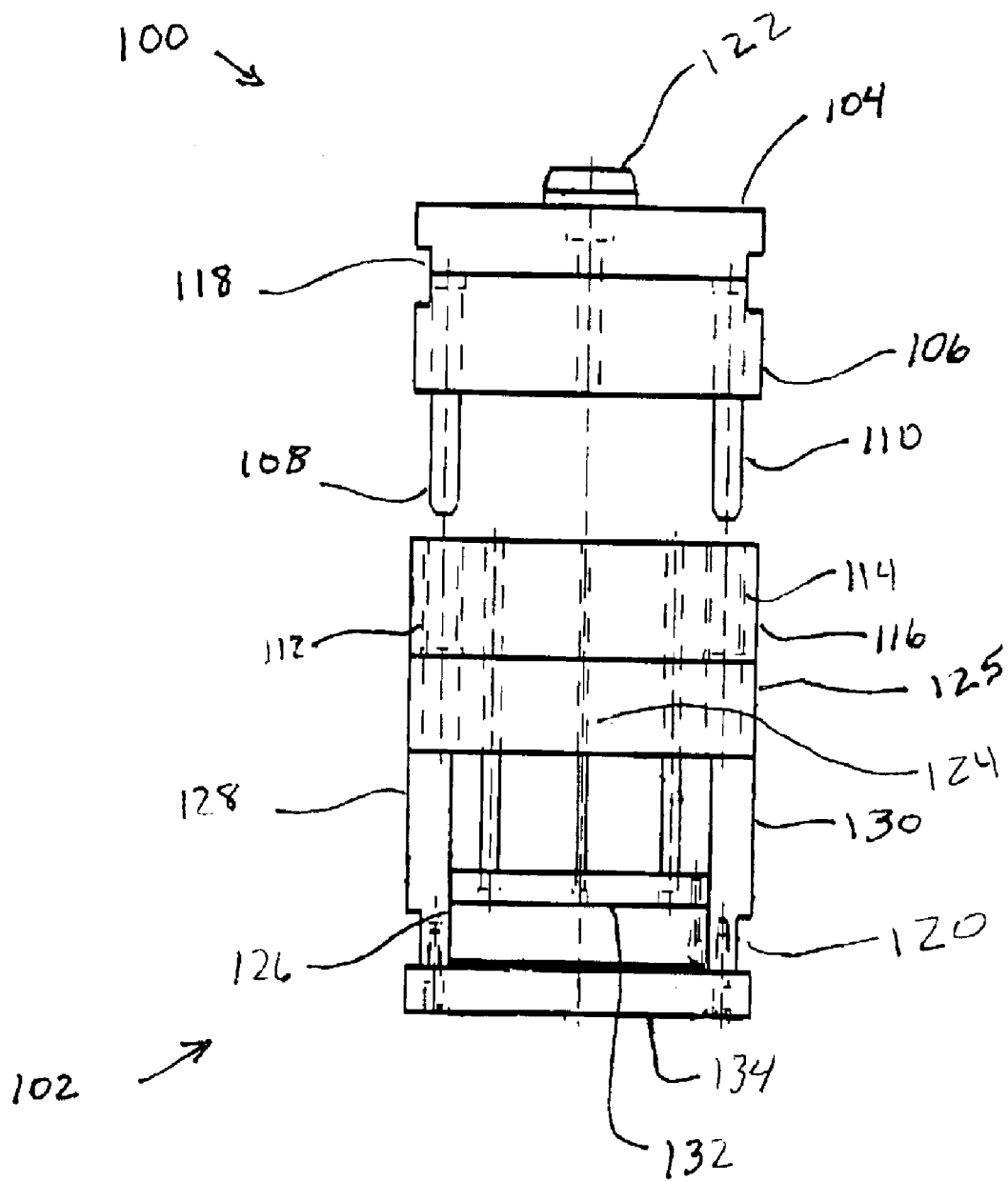
FIG. 1 is an end view of a portion of an injection molding machine.

FIG. 1 is an end view of a portion of an injection molding machine showing typical arrangement and identification of parts within the molding section of an injection molding machine in the open position. The molding machine includes stationary section 100 and movable section 102. Stationary section 100 includes cover clamping plate 104 and cover block 106. The stationary mold assembly for the article to be molded is located within cover block 106. Leader pins 108 and 110 provide for alignment between stationary section 100 and movable section 102.

During mold opening and closing, leader pin guide bushings 112 and 114 of ejector block 116 of movable section 102 ride upon leader pins 108 and 110. Clamping slots 118 and 120 are used in conjunction with a clamp (not shown) to maintain ejector block 116, which houses the movable mold assembly for the article to be molded, tight against cover block 106 when plastic is being injected into the mold. Sprue bushing 122 is the material entry port into the mold and sprue puller pin 124 ensures that the molded article stays within ejector block 116 when ejector block 116 is moved away from cover block 106.

The remaining parts of movable section 102 include support plate 125 and ejector plate 126 which rides within ejector rails 128 and 130 upon guide pins (not shown). Ejector plate 126 is located between ejector retaining plate 132 and ejector clamping plate 134. Ejection of a molded part is effected by forcing ejector plate 126 toward support plate 125 with a knockout (shown in FIG. 5). Ejector pins (not shown) are mounted upon ejector plate 126 and protrude through the wall of the mold plate housed within ejector block 116. The ejector pins act upon the molded article to force the article out of the mold plate.

Figure 2:
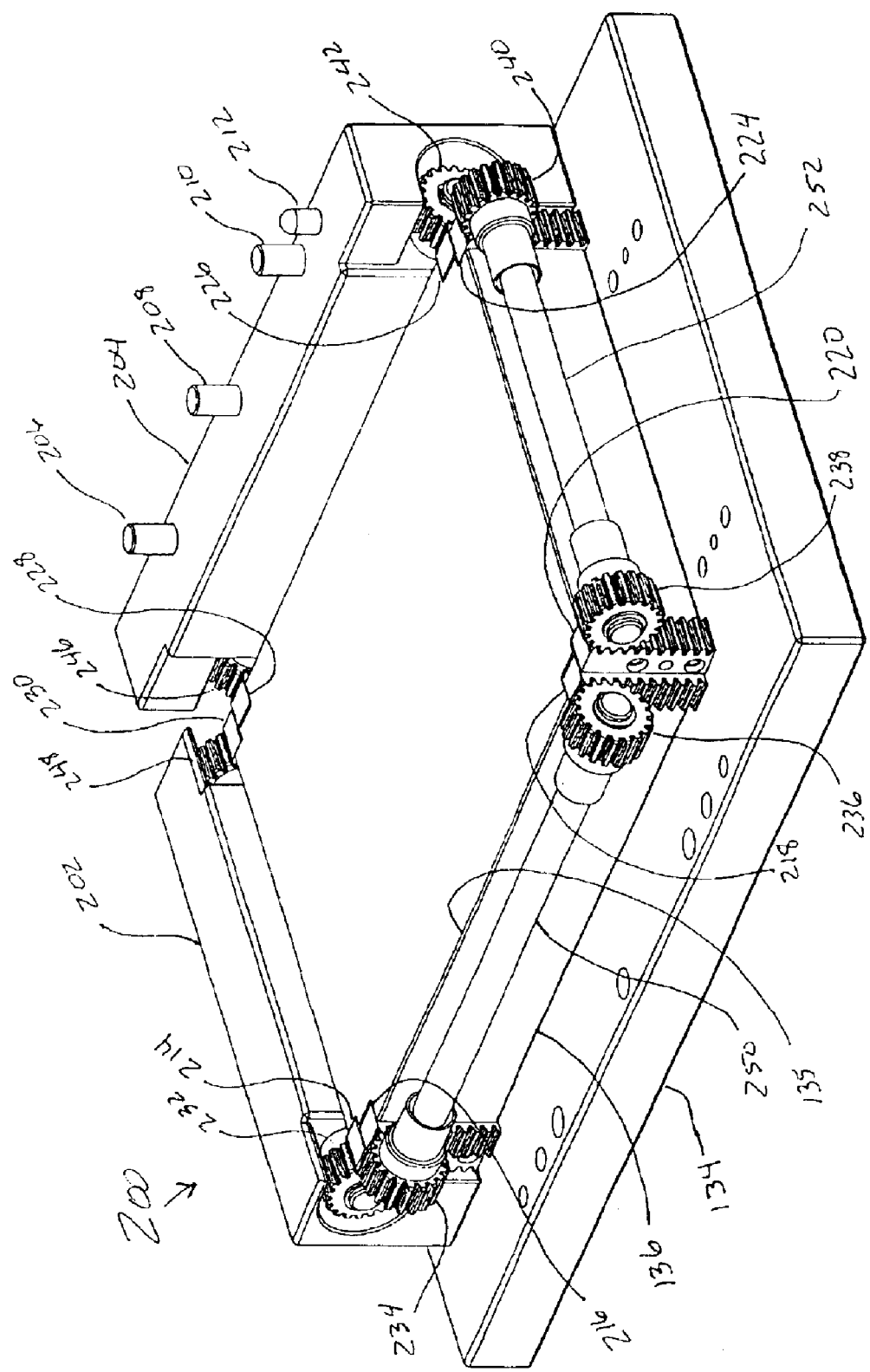
FIG. 2 is a simplified isometric view of a portion of the injection molding machine of FIG. 1.

Referring now to FIG. 2, a simplified isometric view of a portion of a mold assembly and portions of an ejector mechanism are shown. Mold assemblies are specially constructed for each article to be molded. This is because each article presents a unique shape, dictating a mold shape and entry points for ejector pins and vents. Mold assembly 200 includes mold rails 202 and 204 (opposing mold rails are not shown for purpose of clarity). Screws 206, 208 and 210, along with pin 212 are used to attach a mold body (not shown) to mold rail 204 and an opposite mold rail (not shown). The mold body determines the shape of the article to be molded, forming one half of the mold cavity. The mold body includes openings into which ejector pins mounted within ejector pin plate 135 protrude. Ejector pin location is determined by the shape of the article to be molded, and thus are specially located for each article. Ejector pin plate 135 is located on top of ejector plate 136, both of which are movable within mold rails 202 and 204 (and two mold rails not shown) to eject a molded article.

In the embodiment of FIG. 2, rack gears 214, 216, 218, 220, 224, 226, 228 and 230 have been attached to ejector pin plate 135 and ejector plate 136. Rack gears 214, 216, 218, 220, 224, 226, 228 and 230 engage with pinion gears 232, 234, 236, 238, 240, 242, 246 and 248 respectively. Pinion gears 232, 234, 236, 238, 240, 242, 246 and 248 are mounted upon pinion shafts 250 and 252 as well as shafts within mold rails 202 and 204 which are not shown. The pinion shafts are rotatably mounted within the mold rails. Thus, if increased ejection force is experienced within mold assembly 200, the force is transmitted through ejector pin plate 135 to ejector plate 136 and the rack and pinion gears act to distribute the increased force evenly across ejector plate 136 so as to minimize misalignment of ejector plate 136. However, because each mold assembly must be uniquely made for each item to be molded, and because the mold assemblies are retained for future use, a unique set of pinion gears and pinions shafts must be specially fitted to each mold assembly used on a machine. Moreover, the positioning of the pinion gears may be constrained by the particular mold assembly. Therefore, rack position on the ejector plate may need to be modified for each mold assembly.

Figure 3:
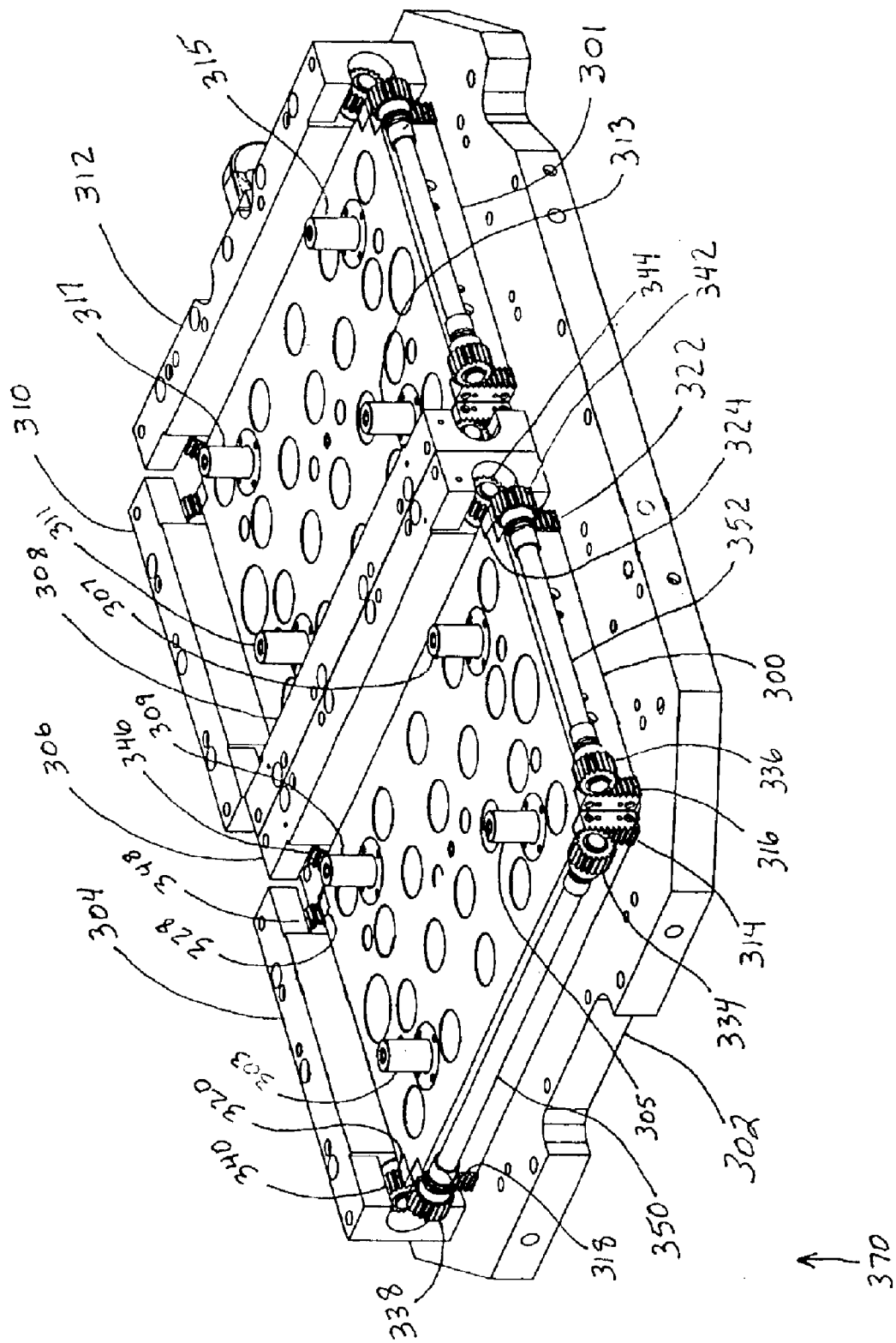
FIG. 3 is a simplified isometric view of a portion of an ejector mechanism in accordance with the present invention within the injection molding machine of FIG. 1.

Referring now to FIG. 3, a simplified isometric view of a portion of an ejector mechanism in accordance with the present invention is shown. The embodiment of FIG. 3 includes portions of two ejector mechanisms including ejector knockout plate 300 and ejector knockout plate 301. Both ejector mechanisms may be constructed in accordance with the present invention. Ejector knockout plate 300 is located within ejector clamping plate 302 and may act upon ejector plate 136 shown in FIG. 2. However, when the present invention is retro-installed, the ejector rails (discussed below) are extended in order to incorporate the pinion gears and shafts. This extension results in the need for a bolster plate intermediate the ejector knockout plate and the ejector plate, and also reduces the daylight opening of the injection molding machine. Shut height is the overall height of the mold assemblies when the injection machine is closed. Daylight opening is the distance between the mold halves when the injection molding machine is open.

Ejector knockout plate 300 is maintained in alignment within four ejector rails by ejector guide pins 303, 305, 307 and 309. For clarity, FIG. 3 shows only two ejector rails associated with ejector knockout plate 300, ejector rail 304 and ejector rail 306. Ejector knockout plate 301 is maintained in alignment within four ejector rails by ejector guide pins 311, 313, 315 and 317. However, only ejector rails 308, 310 and 312 are shown in FIG. 3. Also shown in FIG. 3 are a plurality of rack and pinion gear assemblies including rack gears 314, 316, 318, 320, 322, 324, and 328, which engage pinion gears 334, 336, 338, 340, 343, and 348 respectively. Another rack gear (not shown) engages pinion gear 346.

Also shown are pinion shafts 350 and 352. The rack gears are mounted upon ejector knockout plate 300 and the pinion gears and shafts are mounted within the ejector rails as is shown more clearly in FIG. 4.

Figure 4:
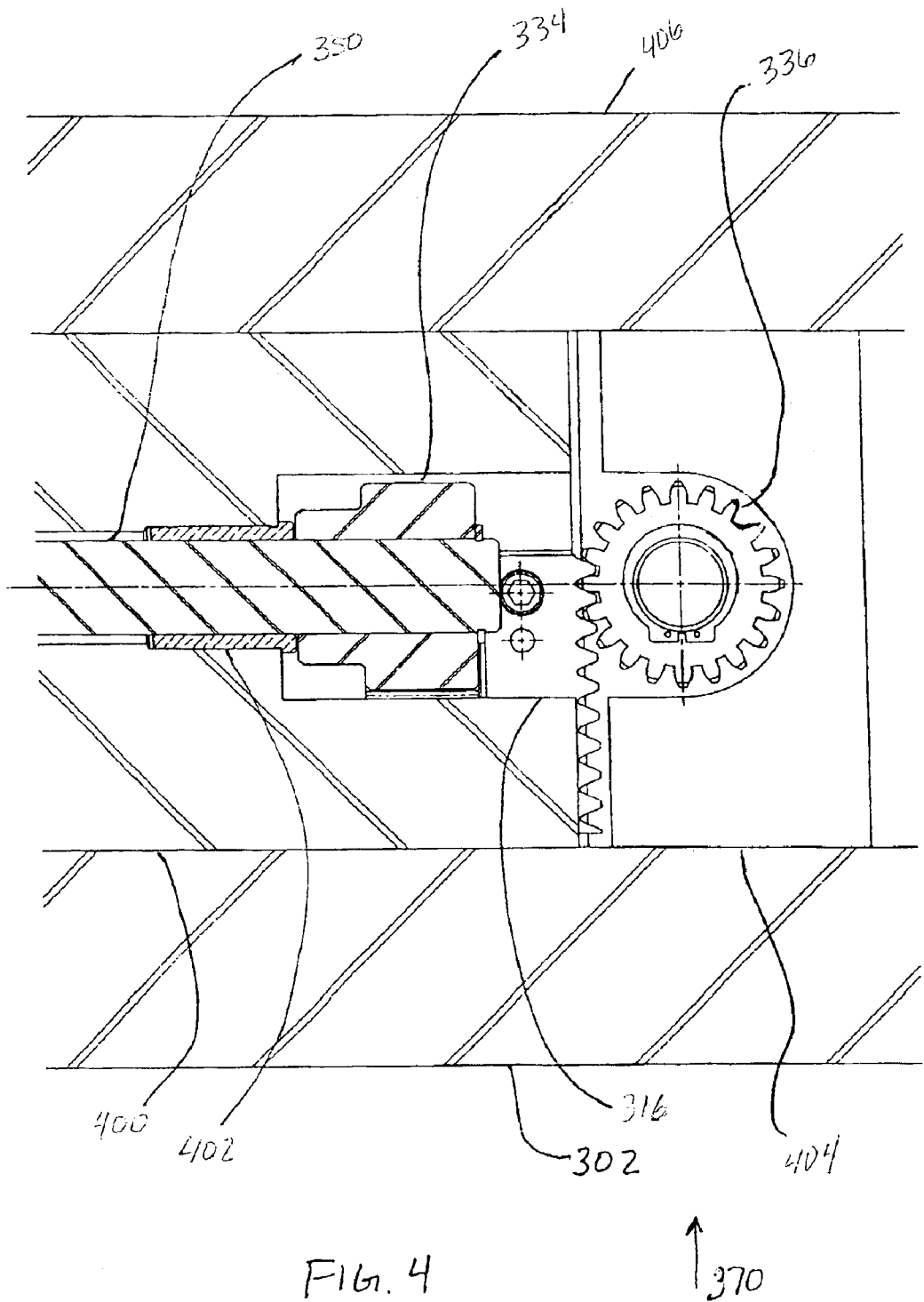
FIG. 4 is a sectional view of one corner of the ejector knockout plate of FIG. 3.

FIG. 4 is a sectional view of one corner of ejector knockout plate of FIG. 3 showing the ejector rails not shown in FIG. 3. Pinion gear 334 is shown connected to pinion shaft 350 which is rotatably connected to rail 400 by bearing 402. Pinion gear 336 is rotatably fixed within rail 404 and engaged with rack gear 316. Bolster plate 406 is located above knockout plate 300 which is not clearly shown in FIG. 4.

Figure 5:
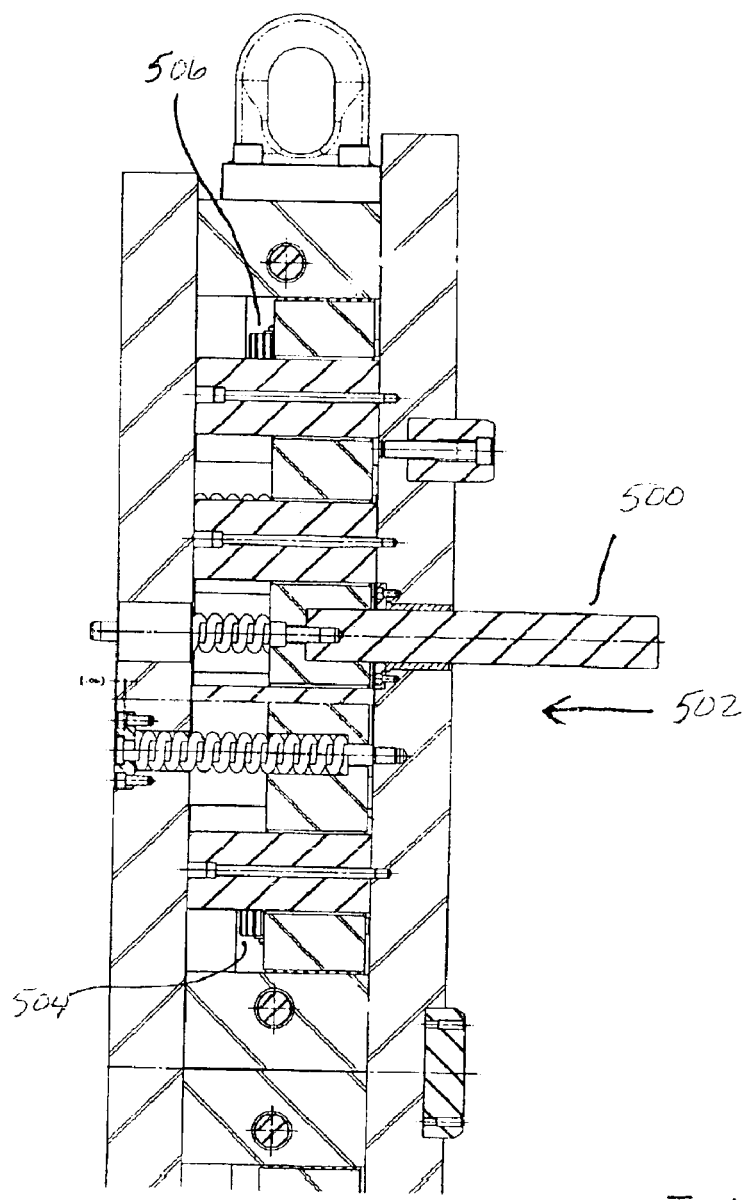
FIG. 5 is a sectional view of an ejector knockout plate of FIG. 3.

Basic ejector operation is described with reference to FIG. 5 which is a sectional view of ejector knockout plate 301 of FIG. 3. In this embodiment ejector knockout plate 301 is configured in the same manner as ejector knockout plate 300. Pressure is applied to knockout 500 which acts upon ejector knockout plate 301 to force ejector knockout plate 301 in the direction of arrow 502. As ejector knockout plate 301 moves in the direction of arrow 502, ejector knockout plate 301 causes pinion gears 504 and 506, located within rail 310 of FIG. 3, to rotate. Movement of ejector knockout plate 301 causes its associated ejector plate and ejector pin plate to move, thus forcing ejector pins attached to the ejector pin plate to force a molded article from a mold assembly. After the molded article has been ejected, knockout 500 is returned to its original position using means well known in the art.

Force equalization during ejector operation is described with reference to ejector knockout plate 300 and FIGS. 3 and 4. When an ejection cycle begins, ejector knockout plate 300 is forced by its associated knockout to move in the direction of arrow 370 of FIG. 3. As ejector knockout plate 300 moves, rack gears 314, 316, 318, 320, 322, 324, a rack gear not shown and 328, cause pinion gears 334, 336, 338, 340, 343, 346 and 348 respectively to rotate. Accordingly, pinion shafts 350, 252, and the pinion shafts within ejector rails 304 and 306 are caused to rotate. Ejector guide pins 303, 305, 307 and 309 assist in maintaining ejector knockout plate 300 in alignment within ejector rails 304, 306, 400 and 404 as ejector knockout plate 300 travels. The ejector guide pins provide inactive alignment for the ejector knockout plate, serving only to constrain the movement of ejector knockout plate 300 within the ejector rails along a path in the direction of arrow 370. This movement continues through ejection of the molded article.

In the event increased resistance to ejection is experienced in a mold assembly during the above process, that resistive force is translated through the ejector pins, the ejector pin plate, the bolster plate (if used) and the ejector plate to ejector knockout plate 300. By way of example, if that resistive force is experienced at the corner of ejector knockout plate 300 shown in FIG. 4, the corner shown in FIG. 4 would tend to slow movement of that corner in direction of arrow 370. This resistive force is translated through rack gears 314 and 316, tending to slow rotation of pinion gears 334 and 336. However, the other corners of ejector knockout plate 300 are not immediately affected by this increased resistance, and the pinion gears associated with those corners will instantaneously continue to be rotated at a speed higher than the rotation of pinion gears 334 and 336. This causes torque to be transferred from pinion gears 338, 340, 343, 346 and 348 through their associated shafts to pinion gears 334 and 336.

Transfer of force between adjacent pinion gears is explained in reference to FIG. 3. For example, if a torque has been transmitted to pinion gear 338, that force is transmitted to rack gear 318. Rack gear 318 is adjacent to rack gear 320. Accordingly, force is transferred through ejector knockout plate 300 to rack gear 320 and translated into rotational force by pinion gear 340. Thus, pinion gears 338 and 340 are operably related through their respective rack gears. This transfer of force also results in a slowing of the rotation of the pinion gears which are not initially affected by the increased resistance. The net effect, is that increased force is transferred to the point of increased resistance while all of the pinion gears are driven to the same rotational speed, thus actively aligning ejector plate 300 within the ejector rails along the path defined by the ejector guide pins.

While the present invention has been described in detail with reference to certain exemplary embodiments thereof, such are offered by way of non-limiting example of the invention, as other versions are possible. By way of example, but not of limitation, fewer or more rack and pinion assemblies may be incorporated into a particular ejector guide system depending on the design of the ejector plate. Moreover, the present invention is not limited to use in a two station injection machine. Furthermore, in certain applications it may be desired to mount the rack gears upon the guideposts, and secure the pinion gears to the ejector plate. It is anticipated that a variety of other modifications and changes will be apparent to those having ordinary skill in the art and that such modifications and changes are intended to be encompassed within the spirit and scope of the invention as defined by the following claims.

I claim:

1. A method of actively aligning a plate within ejector rails of an injection molding machine comprising the steps of, mounting a first, a second, a third and a fourth rack gear to a plate, engaging a first pinion gear operably connected to a first shaft with the first rack gear, engaging a second pinion gear operably connected to the first shaft with the second rack gear, engaging a third pinion gear operably connected to a second shaft with the third rack gear, such that the third pinion gear is operably related to the second pinion gear through the third rack gear, the plate and the second rack gear, engaging a fourth pinion gear operably connected to the second shaft with the fourth rack gear, and moving the plate within the ejector rails of the injection machine.

2. The method of claim 1, further comprising the steps of, mounting a fifth, a sixth, a seventh and an eighth rack gear to the plate, engaging a fifth pinion gear operably connected to a third shalt with the fifth rack gear, such that the fifth pinion gear is operably related to the fourth pinion gear through the fifth rack gear, the plate and the third rack gear engaging a sixth pinion gear operably connected to the third shaft with the sixth rack gear, engaging a seventh pinion gear operably connected to a fourth shalt with the seventh rack gear, such that the seventh pinion gear is operably related to the sixth pinion gear through the seventh rack gear, the plate and the sixth rack gear, and engaging an eighth pinion gear operably connected to the fourth shaft with the eighth rack gear, such that the eighth pinion gear is operably related to the first pinion gear through the eighth rack gear, the plate and the first rack gear.

3. The method of claim 1, wherein the step of mounting a first, a second, a third and a fourth rack gear to a plate comprises the step of mounting the first, die second, the third and the fourth rack gear to a knockout plate.

4. The method of claim 1 wherein the step of mounting a first, a second, a third and a fourth rack gear to a plate comprises the step of mounting the first, the second, the third and the fourth rack gear to an ejector plate.

5. An ejector system for use in an injection molding machine comprising:

(a) an ejector knockout plate, (b) a plurality of rack gears and a plurality of pinion gears, each of the plurality of pinion gears engageable with one of the plurality of rack gears in order to actively align the ejector knockout plate.

6. The ejector system of claim 5, wherein the plurality of pinion gears comprises at least a first, a second a third and a fourth pinion gear, and the first pinion gear is operably connected to the second pinion gear by a shaft, the third pinion gear is operably connected to the fourth pinion gear by a shaft, and the second pinion gear is operably relatable to the third pinion gear.

7. An ejector system comprising, an ejector knockout plate, a first, a second, a third and a fourth rack gear mounted to the ejector plate, a first pinion gear operably connected to a first shaft and engageable with the first rack gear, a second pinion gear operably connected to the first shaft and engageable with the second rack gear, a third pinion gear operably connected to a second shaft and engageable with the third rack gear, the third pinion gear being operably relatable to the second pinion gear through the third rack gear, the ejector knockout plate and the second rack gear, and a fourth pinion gear operably connected to the second shaft and engageable with the fourth rack gear.

8. The ejector system of claim 7, further comprising, a fifth, a sixth, a seventh and an eighth rack gear mounted to the ejector plate, a fifth pinion gear operably connected to a third shaft and engageable with the fifth rack gear, the fifth pinion gear being operably relatable to the fourth pinion gear through the fifth rack gear, the ejector knockout plate and the third rack gear a sixth pinion gear operably connected to the third shaft and engageable with the sixth rack gear, a seventh pinion gear operably connected to a fourth shaft and engageable with the seventh rack gear, the seventh pinion gear being operably relatable to the sixth pinion gear through the seventh rack gear, the ejector knockout plate and the sixth rack gear, and an eighth pinion gear operably connected to the fourth shaft and engageable with the eighth rack gear, the eighth pinion gear being operably relatable to the first pinion gear through the eighth rack gear, the ejector knockout plate and the first rank gear.

9. An injection molding machine comprising, an ejector system plate with a plurality of rack gears attached thereto, a plurality of ejector rails, each of the plurality of ejector rails at least partially adjacent to the ejector system plate, a plurality of pinion shafts, each of the plurality of pinion shafts having a first and a second end, each of the plurality of pinion shafts rotatably secured within one of the plurality of ejector rails, a first plurality of pinion gears fixedly attached to the first end of each of the plurality of pinion shafts and engageable to one of the plurality of rack gears, and a second plurality of pinion gears fixedly attached to the second end of each of the plurality of pinion shafts and engageable to one of the plurality of rack gears.

10. The injection molding machine of claim 9, wherein the ejector system plate is a knockout plate.

11. The injection molding machine of claim 9, wherein the ejector system plate is an ejector plate.

12. The injection molding machine of claim 10, wherein the plurality of pinion shafts comprises at least four pinion shafts, and wherein each of the first plurality of pinion gears is operably relatable to one of the second plurality of pinion gears.

13. The injection molding machine of claim 9, wherein the ejector system plate is of a generally rectangular shape having four corners, each corner operably connectable to one of the first plurality of pinion gears and one of the second plurality of pinion gears.

* * * * *